United States Patent

Perret et al.

Patent Number: 6,033,575

Date of Patent: Mar. 7, 2000

[54] METHOD AND APPARATUS FOR MIXING/SEPARATING TWO NON-MISCIBLE LIQUIDS

[75] Inventors: Jean-Claude Perret, Marly le Roi; Alain Sonntag, Maurepas, both of France; David Goodman, Menco Parc, Calif.

[73] Assignee: Krebs & Cie S.A., France

[21] Appl. No.: 09/068,313

[22] PCT Filed: Nov. 6, 1996

[86] PCT No.: PCT/FR96/01739

§ 371 Date: May 4, 1998

§ 102(e) Date: May 4, 1998

[87] PCT Pub. No.: WO97/17121

PCT Pub. Date: May 15, 1997

[30] Foreign Application Priority Data

Nov. 7, 1995 [FR] France .................................. 95 13138

[51] Int. Cl.[7] .............................. C02F 1/24; B01D 21/24; B01D 21/34

[52] U.S. Cl. ............................ 210/703; 210/86; 210/519; 210/521; 210/744; 210/800; 422/256; 422/257; 422/258

[58] Field of Search ................................ 210/86, 97, 511, 210/519, 521, 522, 634, 801, 802, 806, 702, 703, 800, 744; 422/258, 259, 256, 257

[56] References Cited

U.S. PATENT DOCUMENTS

| 1,176,774 | 3/1916 | Morris | 210/521 |
|---|---|---|---|
| 3,820,954 | 6/1974 | Stonner et al. | 210/521 |
| 3,868,335 | 2/1975 | Stonner et al. | 210/522 |
| 4,235,602 | 11/1980 | Meyer et al. | 422/259 |
| 4,844,801 | 7/1989 | Szanto | 422/256 |
| 4,971,692 | 11/1990 | Sklokin et al. | 210/522 |

FOREIGN PATENT DOCUMENTS

| 570929 | 9/1958 | Belgium . |
|---|---|---|
| 2710241 | 9/1977 | Germany . |

*Primary Examiner*—Joseph W. Drodge
*Attorney, Agent, or Firm*—Bierman, Muserlian and Lucas

[57] ABSTRACT

The method and apparatus mixes two immiscible liquids A and O to form a dispersion and then pre-separates the dispersion into two fractions (A+o) and (O+a) in a spout. These two fractions are fed separately into a decanter with two separate compartments which continue to maintain the two fractions as separate. Within the two separate compartments the two fractions are further separated into two flows, A, O, a, and o, such that four flows exit the decanter.

17 Claims, 3 Drawing Sheets

METHOD AND APPARATUS FOR MIXING/ SEPARATING TWO NON-MISCIBLE LIQUIDS

This application is a 371 of PCT/FR96/01739, filed on Nov. 6, 1996.

BACKGROUND OF THE INVENTION

The present invention provides both a method of mixing and separating two immiscible liquids of different densities, and an apparatus associated with said method. Such apparatus may be referred to as a mixer/separator installation or as a mixer/decanter device. Liquid/liquid extraction is performed therein.

The preferred embodiment of the present invention lies in the context of mixing/separating two liquids as implemented in a mixer/decanter device of the reverse liquid flow type [the decanter being fed from the end of the decanter (its "feed end") that is farthest from the mixer] and with a superposed spout (said mixer and decanter are connected together by a spout disposed above said decanter).

The technical field to which the invention relates is specified a little further on.

The mixing and separating method consists in producing a dispersion of two immiscible liquids, one within the other, that is sufficiently fine to facilitate interchanges between the liquids, and then separating the two immiscible liquids again by decanting (with such separation by decanting being possible providing said two liquids do not have the same density). Generally, one of the liquids is constituted by an impure solution of a given substance while the other liquid is an organic solvent serving either as a solvent that is specific to the substance under consideration or else as a dilution medium for an ion exchanger that is specific to the substance under consideration. The complete installation generally comprises an extraction bank comprising a plurality of mixers/decanters in juxtaposition within which the impure solution of the substance under consideration flows as a counterflow to the organic liquid, followed by a re-extraction bank of identical type in which the organic liquid flows as a counterflow to a pure solution that collects the substance, thereby enabling said organic liquid to be used in a closed circuit.

Each mixer/decanter in the bank essentially comprises a mixer receiving the two liquids, generally via its base, and producing the sought mixture (dispersion) by stirring, followed by a decanter vessel in which said mixture flows slowly and separates progressively, specifically because the liquids are immiscible and the dispersion is not stable. For a given flow rate, it is clear that the size of each mixer depends on the transit time the dispersion requires before going to the separator, which time depends on exchange efficiency, which efficiency increases with increasing fineness of the dispersion. Similarly, the size of each decanter vessel depends on the transit time of the dispersion passing through it, which time is a function of the coalescence speed of the dispersion which, on the contrary, decreases with increasing fineness of the dispersion. Consequently there is always an optimum size for the droplets in the dispersion that provides minimum overall bulk and thus a minimum price for the installation as a whole.

The liquids and mixtures of liquids are generally moved through the installation by means of pumps or pump/stirrers.

Mixing/separating methods and the associated apparatuses are described, in particular, in documents U.S. Pat. No. 4,235,602 and EP-A-0 252 785.

The apparatus described in patent U.S. Pat. No. 4,235,602 is a mixer/decanter of the reverse liquid flow and superposed spout type.

The apparatus described in application EP-A-0 252 785 is a mixer/decanter of the reverse liquid flow and submerged spout type.

To facilitate both the following description of the present invention and also understanding thereof, reference is now made to accompanying FIG. 1 for describing in greater detail the prior art that is closest to the present invention. The present invention comprises an improvement over that prior art. Nevertheless the improvement is not limited solely to that context.

A mixer/decanter of said prior art is shown diagrammatically in FIG. 1. It comprises a mixer/decanter of the type described in patent U.S. Pat. No. 235,602, i.e. of the reverse liquid flow and superposed spout type. Said mixer/decanter advantageously constitutes one stage of an extraction/re-extraction bank.

In FIG. 1, the following are shown:

- the mixer 1 which includes, in particular, separate liquid inlets 2 and 3;
- a pump 5 which raises to an appropriate level the mixture (or the dispersion) formed in said mixer 1 by stirring means 4;
- a spout 6 which transports (or conveys) the liquid mixture leaving the pump 5 to the inlet to the decanter vessel 7 in which the two liquids flow at low speed and separate progressively so as to give rise to a light phase (generally organic) which is removed at 8 together with a heavy phase (generally aqueous) which is removed at 9; and
- a phase boundary regulator 12.

The pump 5 shown is a cone type pump (as described in application FR-A-2 343 905 and also in patent U.S. Pat. No. 4,235,602). Use thereof is particularly advantageous insofar as it does not give rise to any additional stirring and on the contrary, does give rise within itself to a certain amount of coalescence, beginning with the effect of the centrifugal force on the conical stream that flows without turbulence.

In such apparatus, the liquids at the end of the spout 6 furthest from the mixer 1, i.e. the end feeding the decanter vessel 7 have already undergone pre-separation or pre-decanting (beginning in the cone pump 5 and developing during slow progress of the liquids along the spout 6).

To benefit from this pre-separation and to avoid or at the very least limit re-mixing of said pre-separated liquids during transfer via the spout 6 to the decanter vessel 7, means are advantageously provided at said end of the spout 6 (such as independent wiers at different levels across the entire width of said spout 6, . . . ) and/or at the inlet to the decanter vessel 7. FIG. 1 shows a grid 13 extending across the entire width and the full height of said tank 7. This grid 13 constitutes a distributor within said tank 7 and separates a compartment 14 at the end thereof that is furthest from the mixer 1. This grid 13 is made up of a plurality of parallel wall elements that are substantially horizontal or that are preferably inclined in the direction that encourages coalescence and retention of the discontinuous phase, with inclination depending on whether the said discontinuous phase is denser or less dense than the continuous phase.

SUMMARY OF THE INVENTION

On numerous sites throughout the world, the Applicant has implemented various extraction methods in mixers/ decanters of this type, in particular for recovering metals. The Applicant now proposes an improvement to that technology, in which improvement full benefit is taken of any pre-separation or pre-decanting that may occur between the mixed liquids that are to be separated prior to their reaching the decanter vessel. Said improvement can also be implemented in adjacent technologies as will readily be understood by the person skilled in the art.

In a first aspect, the present invention provides a method which consists in a method for mixing/separating two immiscible liquids of different densities. In conventional manner the method comprises the following steps:

feeding a mixer with said two liquids so as to fill the mixer up to a given level;

stirring within said mixer so as to produce a dispersion of said two liquids;

conveying said dispersion to decanting apparatus; this being done under conditions where said dispersion pre-separates into two fractions, each enriched with a respective one of said two liquids; and separating said two liquids within said decanting apparatus.

The above sequence of steps can be implemented in particular in the prior art in apparatus of the type shown diagrammatically in accompanying FIG. 1. Within such apparatus, the dispersion produced in the mixer is pumped to raise it to an appropriate level and it is transferred from the outlet of the pumping means to the decanting apparatus.

The step of conveying the dispersion from the mixer to the decanting apparatus generally includes such pumping. Advantageously, said pumping is implemented under conditions such that pre-decanting or pre-separation of the dispersion already begins to take place during pumping.

In characteristic manner, in the context of the presently claimed method, the pre-separated fractions are recovered separately and are processed separately, independently of each other, within the decanting apparatus.

As mentioned above in the present text, the method of the invention provides an improvement over the prior art method. Said improvement lies in the way in which the step of separation or decanting is implemented. In characteristic manner, this step is implemented in parallel on the two pre-separated fractions which are not put back into contact with each other within the decanting apparatus.

These two fractions which are enriched respectively with one and with the other of the two liquids concerned are themselves established during transfer or conveyance of the mixture (the dispersion) from the mixer to the decanting apparatus. They advantageously begin to be established within the pumping means, when such means are used.

In the context of the present invention, decanting is performed in conventional manner on each of said fractions, but independently after they have been recovered separately. At the end of each of these decanting operations that are performed "in parallel", there are recovered both a main phase and a secondary phase. The corresponding main phases and secondary phases may then optionally be reunited.

Advantageously, in the context of the method of the invention, the level of the phase boundary between the pre-decanted fractions is adjusted prior to processing in the decanting apparatus. To this end, appropriate means are used, generally located at the feed to said decanting apparatus and at the end of the transfer means from the mixer to said decanting apparatus.

For separate treatment of the pre-separated fractions, they are recovered in separate units or compartments of said decanting apparatus. In the present application, the term "units" is used for entities that are "totally independent" whereas the term "compartments" is used for entities that have a wall in common. Advantageously, for questions of bulk (and also for convenience of implementation starting from an existing apparatus), decanting is performed in accordance with the invention within a compartmented decanter vessel, i.e. a tank that is separated into two by a longitudinal wall.

The compartments or units of the decanting apparatus, each fed with one of the pre-separated fractions, are not necessarily of the same volume and/or of the same shape. Thus, in the method of the invention, decanting in one and/or another of said decanting compartments or units may be given an advantage. For equal flow rate, by increasing the volume of one and/or the other of said compartments or units, the transit time of the corresponding fraction therein is increased and the amount of one phase entrained in the other is reduced. Thus, within the context of the invention, it is possible:

to fix the volume and/or the shape of each of the separation units independently; and thus to advantage decanting in one of the two compartments of compartmented decanting apparatus. Under such circumstances, said apparatus is generally not partitioned into two equal portions.

The invention thus provides an additional parameter for optimizing decanting. It is possible, in particular, to use this parameter in the first and/or last decanting apparatuses of a bank of mixers/decanters in order to recover one of the liquids in as pure a form as possible. Generally, an aqueous phase and an organic phase are mixed together and it is desirable to recover an aqueous phase that is as pure as possible.

The method of the invention is based on the principle of completely independent separate treatment for each of the two pre-separated fractions. In the context of such separate treatment, the phase boundary depths are advantageously adjusted completely independently. Thus, the two decanter compartments or units operate with different phase boundary levels.

The compartment receiving the fraction that is enriched in the heavier liquid (e.g. an aqueous phase) "naturally" includes a thick bottom stream that is highly enriched in said heavier liquid; the bottom stream carrying a thin top stream that is highly enriched in the lighter liquid (e.g. an organic phase).

The compartment that receives the fraction enriched in the lighter liquid (e.g. the organic phase) "naturally" includes a thin bottom stream that is highly enriched in the heavier liquid (e.g. the aqueous phase); said bottom stream underlying a thicker top stream that is highly enriched in said lighter liquid.

The thicknesses of each of said streams are advantageously adjusted by means of appropriate apparatuses disposed inside or outside the decanting compartments or units, which apparatuses are conventional.

The decanting performed independently on the pre-separated fractions, advantageously in combination with judicious adjustment of the phase boundary depths within each of said fractions, makes it possible to treat deep streams respectively highly enriched in heavier liquid and highly enriched in lighter liquid within the compartments or units of the decanting apparatus. This is particularly advantageous insofar as it is then possible within such relatively thick streams to implement, in situ, additional treatments for facilitating separation of the two liquids.

In particular, in the decanting compartment or unit receiving the pre-separated fraction that is enriched in the heavier liquid, there is, as mentioned above, a thick bottom stream that is highly enriched in said heavier liquid. Advantageously, in the context of the present invention, gas is bubbled through said thick lower stream (generally by injecting air or an inert gas), thereby enhancing both separation of any remaining lighter liquid still mixed with the heavier liquid and also separation of dross by flotation. Downstream from said flotation, it is therefore advantageous to provide means for collecting said dross which collects at the phase boundary.

In the prior art method where the entire pre-decanted dispersion was treated in a single decanter vessel, it was not possible to perform such flotation in situ. It would have created excessive disturbance in the top stream that is highly enriched in the lighter phase and that is of significant thickness. In the prior art, such flotation has been implemented outside the decanter vessel on the phase that is highly enriched in the heavier liquid, but only after it has been removed from the decanter vessel (separately from the phase that is highly enriched in the lighter liquid).

Similarly, in the context of the present invention, it is also advantageous to make use of coalescence promoters. Such promoters of appropriate type can be used in each of the decanting compartments or units within the majority phase (constituting the stream of sufficient thickness). This facilitates:

separating out traces of the lighter liquid (generally an organic phase) contained in the stream of the heavier liquid (generally an aqueous phase) by placing an appropriate coalescence promoter therein (an oil-absorbing substance). If bubbling means and possibly also dross-collection means are already present within said stream of heavier liquid, then said coalescence promoter may be superfluous. In any event, if used, it is naturally located downstream from said bubbling means and said dross collection means; and separating out traces of the heavier liquid (generally an aqueous solution) from the stream of lighter liquid (generally an organic phase), by placing therein an appropriate (water-absorbing) coalescence promoter.

Thus, in the context of the method of the invention, the fraction enriched in heavier liquid and/or the fraction enriched in lighter liquid is advantageously treated together with an appropriate coalescence promoter in the main stream (in each of the decanting compartments or units).

On reading the above, the person skilled in the art will already have understood the advantage of the present invention. In particular, the invention proposes implementing higher-performance decanting, thus reducing the total surface area devoted to decanting (for given performance). Also, insofar as said decanting is performed in two separate compartments or units, it is easier to manage maintenance of the equipment. It is thus possible to provide improved access to the compartment or unit that requires more maintenance.

The person skilled in the art will also have understood that in the context of mixing/separating methods implemented in a bank of mixers/decanters with countercurrent flow of the two liquids in conventional manner (heavier/lighter; generally aqueous solution/organic solvent), the method of the invention is highly advantageous. It can be implemented therein uniformly in all of the decanters of the bank. It can also be implemented judiciously in non-uniform manner in the various decanters. The invention provides two additional parameters for optimizing separation within a decanter, more precisely within decanter apparatus constituted by two decanting compartments or units. Within each decanter of the bank, it is possible to adjust:

the dimensions or volumes and/or shapes of the decanting units or compartments; and the phase boundary thresholds within said units or compartments.

The method of the invention is thus particularly advantageous insofar as it makes it possible to select specific flow rates for each of the two compartments of a decanter, or indeed for each of the decanter compartments in a mixer/decanter bank, for the purpose of optimizing the purity required of one or other of the phases in circulation.

There follows a description of the second aspect of the present invention, namely a mixer/decanter installation for two liquids within which the above-described method can be implemented. Such a mixer/decanter installation for two immiscible liquids of different densities is of the same type as prior art mixers/decanters. It comprises at least one assembly constituted by a mixer associated with a decanting apparatus. The mixer includes means for feeding it, generally in separate manner, with two liquids; it is also fitted with stirring means; finally, it is connected to the decanting apparatus via a spout (or any equivalent means). As the dispersion (or mixture) generated in the mixer progresses along said spout, pre-separation takes place therein. To drive such progress, use is generally made of pumping means. The presently claimed installation is of the same type as prior art installations. However, in characteristic manner, it includes means for separately recovering the pre-separated fractions at the outlet of the spout, and its decanting apparatus is organized as two separate units or compartments in which the recovered fractions are subjected to separate treatment (or decanting).

The spout is organized to deliver the two pre-separated fractions separately to specific decanting volumes (which fractions are pre-separated within the spout).

In characteristic manner, the decanting apparatus of the installation of the invention comprises two separate units or compartments respectively fed with a fraction that is enriched in heavier liquid (e.g. an aqueous phase) and a fraction enriched in lighter liquid (e.g. an organic phase); which fractions are themselves separated in the spout connecting the mixer to said decanting apparatus.

In a preferred variant of the invention, the decanting apparatus comprises a compartmented decanter, i.e. two vertical decanter compartments that are side by side along their length. In the context of this preferred variant, the partition subdividing said decanter into said two side-by-side compartments may itself be vertical or inclined over at least a fraction of its height. It is thus possible to have compartments of different shapes. Each of said compartments has its own feed and discharge channels and its own adjustable phase boundary threshold, e.g. at the outlet for the heavier phase. It is explained above that the phase boundary depth in each of said compartments can thus be adjusted independently. In the two preceding sentences, the term "units" could naturally be used instead of the term "compartments".

The means at the outlet of the spout for feeding the two specific decanting volumes with the two pre-separated fractions (without putting them back into contact) can be implemented in various different ways. In particular, it is possible to provide two sluices across the entire width of the spout at its end for feeding the decanting apparatus, which sluices are offset relative to each other and comprise an upper sluice for transferring the pre-separated fraction that is enriched in the lighter liquid, and a lower sluice for transferring the pre-separated fraction that is enriched in the heavier liquid. Each of said sluices should deliver the corresponding pre-separated fraction via at least one pipe into the appropriate decanting volume (unit or compartment). A plurality of pipes may be provided across the width of each of said sluices, which pipes may be spaced apart regularly. It is also possible to provide only the upper sluice to transfer the fraction that is enriched in the lighter liquid while the fraction that is enriched in the heavier liquid is transferred by pipes which open out directly into the bottom of the spout.

This embodiment applies more specifically to installations of the type having a superposed spout, with reverse liquid flow, and a compartmented decanter. At the outlets from the pipes, the extracted fractions are directed to one compartment or the other. They may be directed by means of a deflector. The deflector occupies the top portion of a compartment and advantageously has its bottom end secured to the wall subdividing the decanter into two compartments.

In other contexts, each of the pipes connected to said sluices of the spout may convey a pre-separated fraction to a totally independent decanting unit.

It is also possible to provide for pre-separated fractions to be taken from the spout at positions that are spaced wide apart.

It will readily be understood that the installation of the invention can exist in numerous variants. Whatever the way in which the mixer/decanter is organized, it suffices to provide means for separately recovering the pre-separated fractions together with appropriate decanting units or compartments for separately treating the fractions recovered in this way.

Advantageously, as already mentioned above, said decanting means and volumes are disposed in an installation of the type having a superposed spout and reverse liquid flow. Said decanting volumes, whether in the form of totally independent units or of compartments separated by a partition, may optionally have the same volume and/or the same shape. The advantage that this can provide is mentioned above. Clearly this characteristic of the installation (decanting units or compartments having the same volume or having different volumes, having the same shape or different shapes) is completely independent of the type of said installation.

The improvement of the present invention was developed to extract maximum advantage from the pre-separation that takes place while the mixture is being transferred to the decanter. The pre-separation that occurs at the outlet from the spout is most effective when it begins upstream from said spout, within the pumping means (when such means are used).

Thus, in an advantageous variant, an installation of the invention makes use of low-turbulence pumping means within which there begins pre-separation of the two liquids constituting the pumped dispersion. Such pumping means, in particular of the cone pump type, have been described as mentioned above in application FR-A-2 343 905, in particular. In a preferred variant of the invention, the mixer of the installation thus includes, above the stirring means, a low-turbulence raising pump of the type constituted by an upwardly-flared frustoconical stator and trapezoidal rotor blades; said rotor being secured to a rotary vertical shaft for driving said stirring means.

The description above specifies the essential means for constituting a mixer/separator installation of the invention within which it is possible to implement the method of the invention. For implementing advantageous variants of said method, which variants are described above, additional means are implemented within said installation, either independently or advantageously together.

Thus, it is advantageous to provide the spout (close to its end for feeding the decanting apparatus) with means for adjusting the level of the phase boundary therein. Such means may be constituted, in particular, by a dam of adjustable height h, which dam is situated downstream from the point from which the fraction enriched in heavier liquid is taken. Such a dam ensures that the phase boundary (between the fraction enriched in heavier liquid and the fraction enriched in lighter liquid) is at a chosen level for limiting entrainment of the lower stream by the upper stream.

It is thus advantageous to provide within each of the decanting compartments or units of the decanting apparatus means for adjusting the depth of the phase boundary therein. Said means may be located within said compartment or unit or outside it, on an outlet pipe. Such means are themselves known. Within a decanting volume, it is possible to find dam type means located close to the outlet pipe for the fraction that is highly enriched in the heavier liquid. Outside the decanting volume, one can find, on the outlet pipe for the fraction highly enriched in the heavier liquid, means for adjusting the depth of the phase boundary and of the type described in patent U.S. Pat. No. 4,235,602 (shown diagrammatically in accompanying FIG. 1 under reference 12). These means are mainly constituted by a cylinder within which there moves in sealed manner a piston that is extended by a central chimney forming a wier at its top end. It is clearly advantageous to implement such means (be they identical or different) in each of said decanting compartments or units. Nevertheless, this is no more than an additional improvement and it is quite possible within the context of the invention to make use of such means in one only of the decanting compartments or units. It is emphasized that such means when used in the context of the present invention enable the level of the phase boundary within a decanting compartment or unit to be adjusted in a manner that is completely independent from that implemented in the other decanting compartment or unit.

Similarly, the following may advantageously be provided:

in the decanting compartment or unit to which there is directed the pre-separated fraction that is enriched in the heavier liquid, i.e. the compartment or unit having the thick bottom stream, means for implementing flotation by bubbling gas (e.g. air or inert gas). Said means are advantageously associated, downstream, with means for recovering dross entrained by said flotation. It is also possible to provide a coalescer downstream from said means for implementing flotation and recovering dross, which coalescer is therefore not dirtied with dross. Whether it is appropriate to make use of such a coalescer constitutes a judgment to be performed by the person skilled in the art. Flotation can itself make such a coalescer entirely superfluous;

in one or both of the decanting compartments or units, means to promote coalescence within the thicker stream (i.e. the stream constituted by the majority phase). Said means must clearly be adapted to the phase in which they operate. They should have surface tension characteristics adapted to the nature of the minority phase that is to be eliminated from the majority phase. As mentioned above, the use of such means may turn out to be superfluous in a thick stream that is rich in heavier liquid within which bubbling has already been implemented. Nevertheless, in this context, such use need not be excluded, and in any event it may be highly advantageous in any such a stream (heavier liquid, thick) within which no bubbling has been performed.

It is thus possible to improve the separation that occurs between the heavier liquid and the lighter liquid (due to decanting) within each of the compartments or units of the decanting apparatus.

It will be observed that at the outlet from each of the compartments or units of the decanting apparatus of the invention, a main flow is recovered together with a secondary flow at a smaller flow rate than the main flow.

Depending on the quality of the secondary flow and depending on the specifications of the method, said secondary flow from one compartment or unit may advantageously, in full or in part:

either be united with the main flow from the other compartment or unit (providing the drives are compatible);

or be recycled to the mixer;

or else be removed from the circuit for special treatment.

At this point, it may incidentally be observed that in general, to ensure that the method operates properly, it is always appropriate to have a certain quantity of secondary phase within a decanting compartment or unit. The person skilled in the art will be able to dimension the installation and compute flow rates so as to optimize the sought result.

Finally, it is shown above that the mixer/separator installation of the invention includes at least one assembly constituted by associating a mixer and decanting apparatus that are interconnected by a spout (or any equivalent means). In general, the installation includes at least one bank. It will be observed that within said bank, the decanting units or compartments are not necessarily all of the same volume and/or the same shape. This applies not only to all of the decanting apparatuses within the bank, but also to individual decanting apparatuses of the bank. As mentioned above in the present text, it can be advantageous to implement decanting of the pre-separated fractions at the outlet from a single spout in decanting units or compartments that are of different volumes and/or shapes.

The accompanying figures illustrate the context of the present invention and also the present invention itself.

BRIEF DESCRIPTION OF THE INVENTION

DETAILED DESCRIPTION OF THE INVENTION/PREFERRED EMBODIMENT OF THE INVENTION

Figure 1:
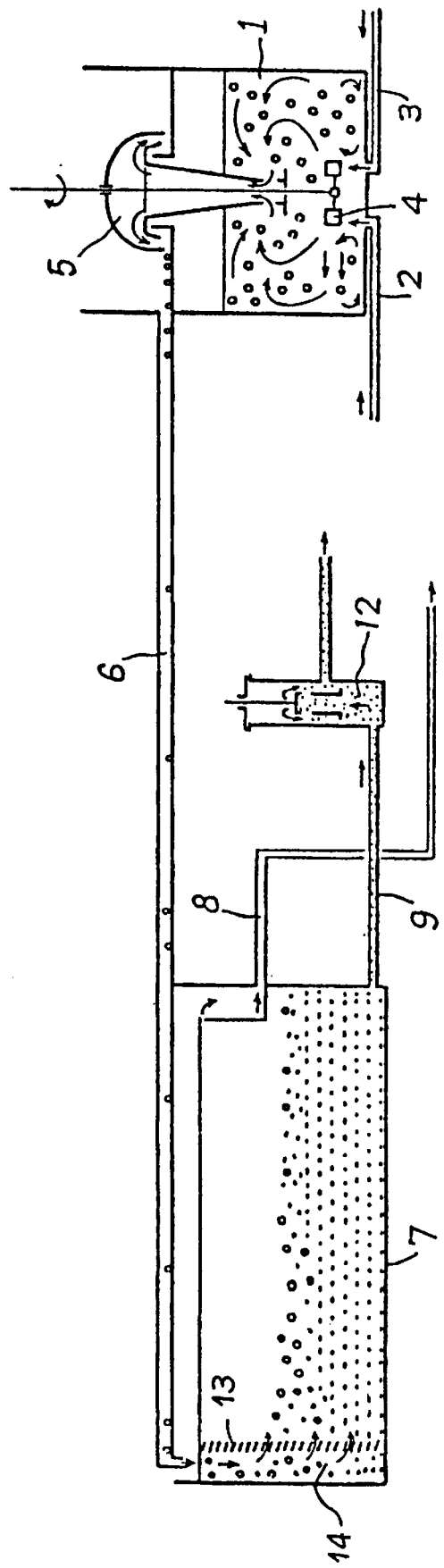
FIG. 1 is a diagrammatic vertical section through a prior art mixer/decanter.

FIG. 1 is described in the introduction of the present description. It is a diagram of a prior art mixer/decanter of the type having reverse liquid flow and a superposed spout.

Figure 2:
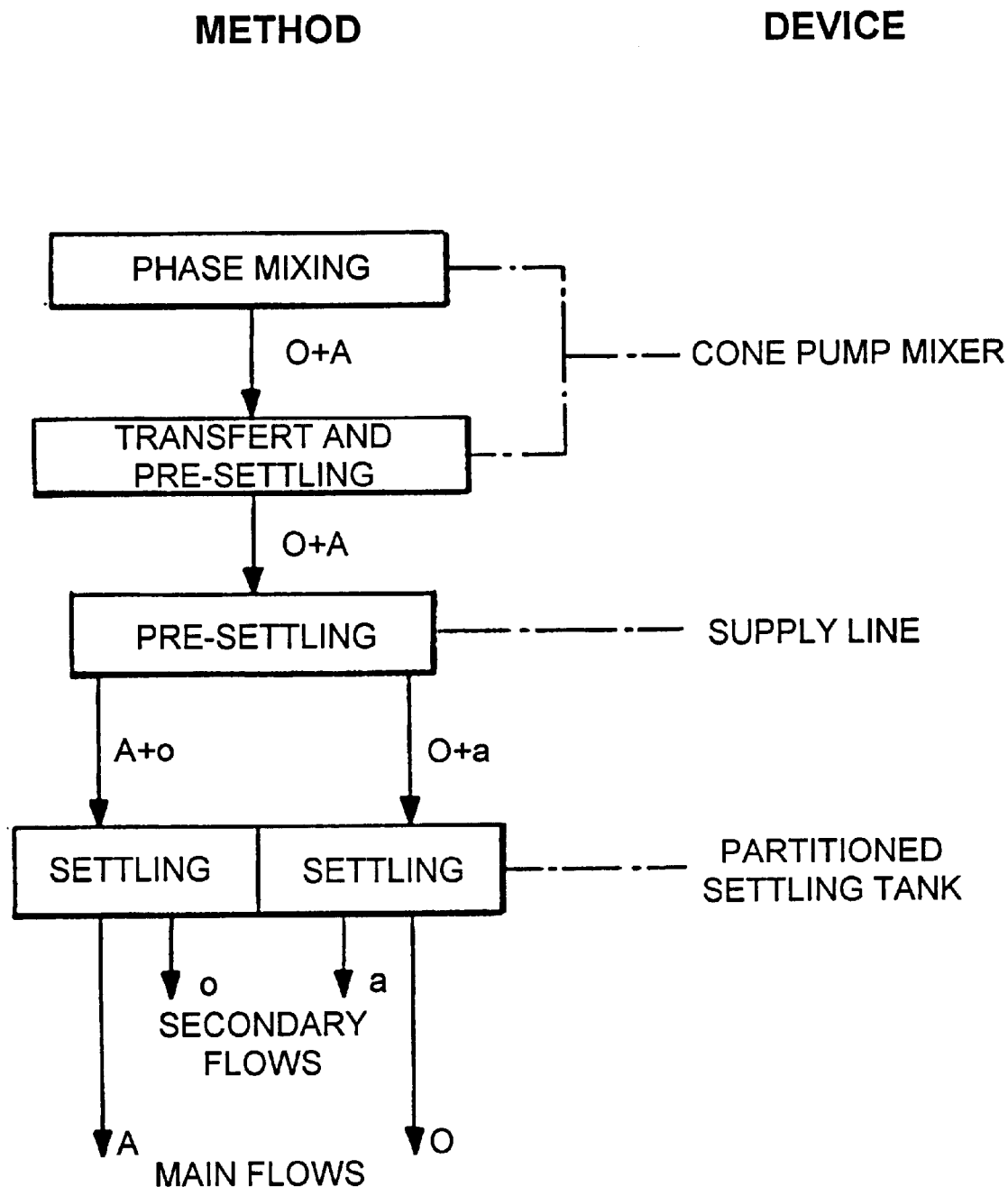
FIG. 2 is a diagram of the mixer/separator method and installation of the invention (in an advantageous variant).

FIG. 2 speaks for itself. It is a flow chart showing the method of the invention in the context of a preferred implementation for apparatus of the type shown in FIG. 1 (using a mixer and cone pump, a superposed spout, and a decanter vessel fed from its far end), but also including in characteristic manner a decanter vessel that is compartmented together with means for feeding each of the compartments of said decanter vessel with the fractions that have pre-separated in the spout.

An organic phase is referenced O (or $\underline{o}$) while an aqueous phase is referenced A (or $\underline{a}$).

The phases are initially mixed together (A+O). After pre-separation (taking place in the pump and in the spout), two pre-separated phases are recovered at the outlet from the spout: (A+$\underline{o}$) and (O+$\underline{a}$). In characteristic manner, said fractions are recovered separately and they are treated separately in the two compartments of the decanter vessel. Four flows are recovered separately at the outlet from said compartmented decanter vessel:

a main aqueous phase: A;

a secondary organic phase: $\underline{o}$;

said two phases coming from the compartment that has treated the water-enriched fraction (A+$\underline{o}$);

a main organic phase: O; and a secondary aqueous phase: $\underline{a}$;

said two phases coming from the compartment that has treated the organic solvent enriched fraction (O+$\underline{a}$).

Figure 3:
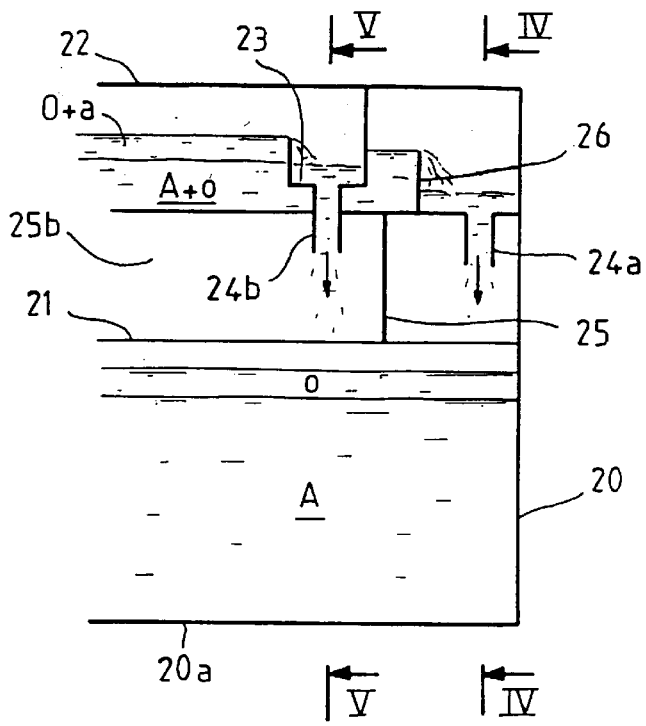
FIG. 3 is a diagrammatic longitudinal section through a portion of an installation of the invention (of the type having reverse liquid flow and a superposed spout); specifically it shows the end of the spout where it feeds the decanting apparatus.
Figure 4:
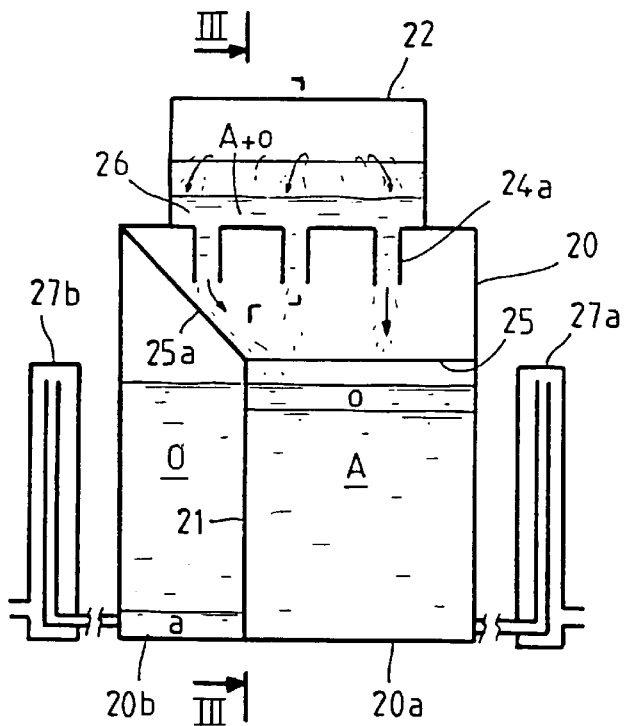
FIG. 4 is a diagrammatic cross-section on IV—IV of said feed end portion of said installation of the invention.
Figure 5:
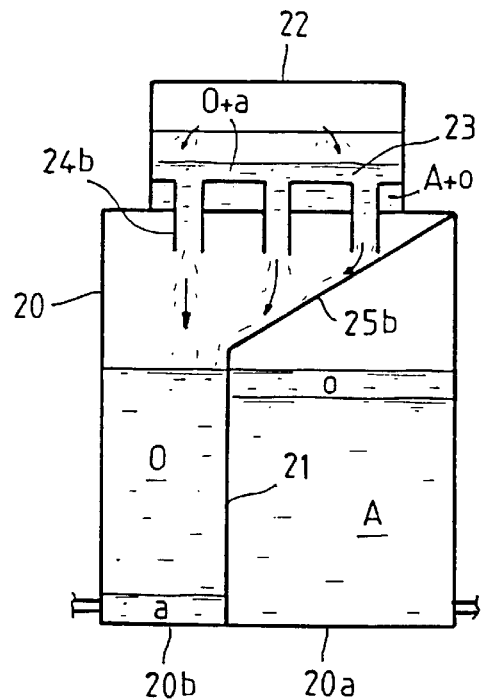
FIG. 5 is a diagrammatic cross-section on V—V of said feed end portion of the installation of the invention.

FIGS. 3 to 5 show diagrammatically:

at 20 the compartmented decanter vessel; at 20*a* the compartment of said decanter vessel 20 in which there flows the pre-separated fraction enriched in aqueous phase (A+$\underline{o}$); at 20*b*, the compartment of said decanter vessel 20 in which there flows the pre-separated fraction enriched in organic phase (O+$\underline{a}$);

at 21 the partition separating said decanter vessel 20 into said two compartments 20*a* and 20*b*; and at 22 the superposed spout.

At the end of said spout 22, there are means for separately transferring the pre-separated fractions (A+$\underline{o}$) and (O+$\underline{a}$). The fraction (O+$\underline{a}$) is transferred via the wier 23 and the associated pipes 24*b* into the compartment 20*b*. The fraction (A+$\underline{o}$) is transferred by the pipes 24*a* into the compartment 20*a*. These transfers are "facilitated" by the use of deflector plates 25*a* and 25*b* and a separator plate 25.

Finally, the figures show:

at 26, a dam disposed in the spout 22 to adjust the level of the (A+$\underline{o}$)/(O+$\underline{a}$) phase boundary therein (i.e. between the two pre-separated fractions); and at 27*a* and 27*b* means for adjusting the level of the A/$\underline{o}$ and O/$\underline{a}$ phase boundaries within each of the compartments 20*a* and 20*b*. Said means 27*a* and 27*b* are situated outside said compartments 20*a* and 20*b* on the outlet pipes for the primary aqueous phase A and the secondary aqueous phase $\underline{a}$. Said pipes are provided at the opposite end of the decanter vessel 20 (the end opposite from its end fed by the spout 22).

Said FIGS. 3 to 5 show the principles on which the present invention is based. As can be seen therein, each aqueous outlet (e.g. heavier liquid outlet) and each organic outlet (e.g. lighter liquid outlet) of the spout is connected to a specific compartment for decanting. In this way, the aqueous and organic phases that have been pre-separated (advantageously) in the cone pump and in any event in the spout are not put back into contact and are therefore not mixed together again. There is thus a compartment 20*a* that is fed for the most part with aqueous phase (A+$\underline{o}$) and also a compartment 20*b* that is fed for the most part with organic phase (O+$\underline{a}$).

What is claimed is:

1. A method of mixing and separating two immiscible liquids of different densities, the method comprising:

feeding a mixing with said two liquids so as to fill the mixer up to a given level;

stirring within said mixer so as to produce a dispersion of said two liquids;

conveying said dispersion to a decanting apparatus; this being done under condition where said dispersion pre-separates into two fractions, separated by a phase boundary, each enriched with a respective one of said two liquids; and separately recovering and separately treating said two pre-separated fractions, independently from each other, within said decanting apparatus, so as to obtain four separate flows, a first main one and a first secondary one from one of said two pre-separated fractions and a second main one and a second secondary one from the other of said two pre-separated fractions.

2. A method according to claim 1, characterized in that the level of the phase boundary between said pre-separated fractions is adjusted so as to optimize the pre-separation.

3. A method according to claim 1, characterized in that said pre-separated fractions are respectively treated in decanting units or compartments within said decanting apparatus that do not have the same volume and/or the same shape.

4. A method according to claim 1, characterized in that the separate treatments of said pre-separated fractions are implemented with separate adjustments of respective phase boundary depths.

5. A method according to claim 1, characterized in that the treatment of the fraction enriched in the heavier of the two liquids comprises flotation by gas bubbling within the heavier liquid and, optionally, downstream from said flotation, dross collection.

6. A method according to claim 1, characterized in that the treatment of the fraction enriched in the heavier of the two liquids and/or the treatment of the fraction enriched in the lighter of the two liquids is supplemented with treatment utilizing a coalescence promoter.

7. A method according to claim 1, implemented utilizing a bank of mixers and decanting apparatus with counterflow circulation of said two liquids, characterized in that separation is optimized by adjusting, within each decanting apparatus of said bank:

the dimensions and/or shapes of decanting units or compartments of said decanting apparatus; and/or the phase boundary threshold within each of the decanting units or compartments of said decanting apparatus.

8. An installation for mixing and separating two immiscible liquids (A, O) of different densities, said installation comprising at least one assembly constituted by a mixer associated with a decanting apparatus (20); said mixer including means for being fed with said two liquids (A, O), being fitted with stirring means for forming a dispersion from said two liquids, and being connected to said decanting apparatus (20) by a spout (22) within which pre-separation of the dispersion conveyed from said mixer to said decanting apparatus (20) takes place, said spout having an output which is connected to said decanting apparatus; said installation being characterized in that it further includes means (23, 24b, 24a) for separately recovering the pre-separated fractions (A+o, O+a) at the output from said spout (22) and in that said decanting apparatus (20) is organized as two separate units or compartments (20a or 20b) for separately treating said pre-separated fractions (A+o, O+a) so as to obtain four separate flows (O,A,o,a), a first main one (A) and a first secondary one (o) from one of said two pre-separated fractions (A+o) and a second main one (O) and a second secondary one (a) from the other of said two pre-separated fractions (O+a).

9. An installation according to claim 8 wherein said spout is a superposed spout and said installation is a reversed liquid flow installation.

10. An installation according to claim 8, characterized in that said mixer further includes pumping means feeding said spout (22).

11. The installation according to claim 10 wherein said stirring means has a vertical rotating shaft; and said pumping means is a low turbulence, liquid raising pumping, positioned above said stirring means, constituted by an upwardly flared frustoconical stator together with a rotor having trapezoidal blades, said rotor of said pump being fitted to said vertical rotary shaft of said stirring means.

12. An installation according to claim 8, characterized in that the separate units or compartments (20a and 20b) of said decanting apparatus (20) do not occupy the same volume and/or do not have the same shape.

13. An installation according to claim 8, characterized in that it further includes, at the end of said spout (22) feeding said decanting apparatus (20), means (26) for adjusting the level of the phase boundary between the fractions (A+o,O+a) pre-separated in said spout (22).

14. An installation according to claim 8, characterized in that each unit or compartment (20a, 20b) of said decanting apparatus (20) includes within itself or on one of outlet pipes for handling the separate flows, means (27a, 27b) for adjusting the depth of the phase boundary therein.

15. An installation according to claim 8, characterized in that one of said units or compartments (20a) of said decanting apparatus (20) is fitted with means for implementing flotation by bubbling; and, optionally, with means disposed downstream from said flotation means, for collecting dross entrained thereby.

16. An installation according to claim 8, characterized in that at least one of said units or compartments (20a and/or 20b) of said decanting apparatus (20) is fitted with means for promoting coalescence.

17. An installation according to 8, including at least one bank of mixers and decanting apparatus, the installation being characterized in that all of the compartments or units of the decanting apparatus of said bank do not have the same volume and/or the same shape.

* * * * *